United States Patent [19]
Schaffer

[11] 3,837,328
[45] Sept. 24, 1974

[54] COLLAPSIBLE GRILL
[75] Inventor: James L. Schaffer, Los Gatos, Calif.
[73] Assignee: John A. Marlo, Aptos, Calif. ; a part interest
[22] Filed: Aug. 14, 1972
[21] Appl. No.: 280,742

[52] U.S. Cl................ 126/29, 126/9 R, 126/30, 248/439
[51] Int. Cl.... F24c 15/18, A47j 37/04, F16m 11/00
[58] Field of Search............ 126/9 R, 29, 30, 25 R, 126/25 A, 38; 248/165, 436, 439, 173; 211/178 R

[56] References Cited
UNITED STATES PATENTS

| | | | |
|---|---|---|---|
| 1,329,955 | 2/1920 | Busby | 126/30 X |
| 2,240,367 | 4/1941 | Fernholtz | 126/9 R |
| 2,669,117 | 2/1954 | Fuhrmann | 126/30 X |
| 3,461,634 | 8/1969 | Earl | 126/30 X |

Primary Examiner—Meyer Perlin
Assistant Examiner—Harold Joyce
Attorney, Agent, or Firm—Limbach, Limbach & Sutton

[57] ABSTRACT

A collapsible grill for camping, the grill having a grate with a plurality of interlinked cross members which can be rolled up or opened to a rectangular grate, the grate is supported on a pair of crossed support members which are elevated above the ground by four support legs hinged thereto, the legs having a notched projection to which the corners of the grill can be attached.

4 Claims, 4 Drawing Figures

PATENTED SEP 24 1974          3,837,328
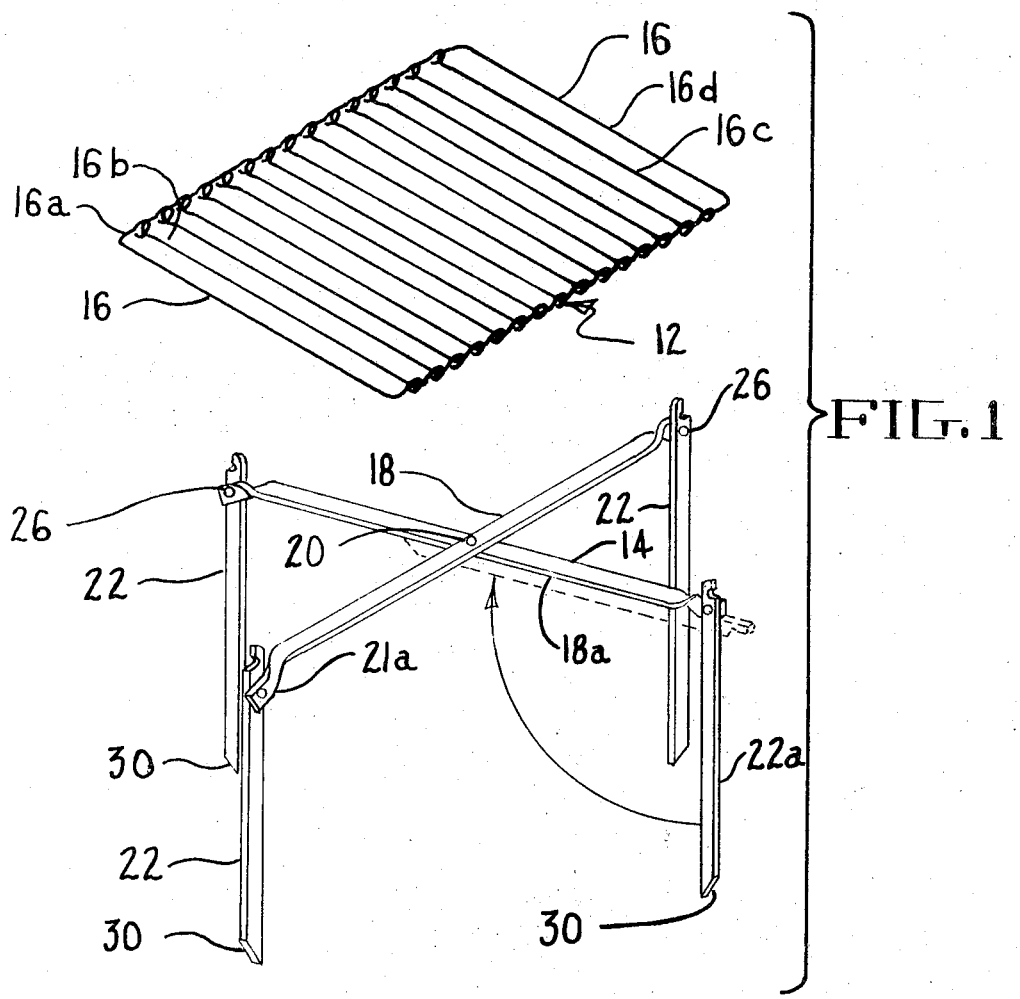
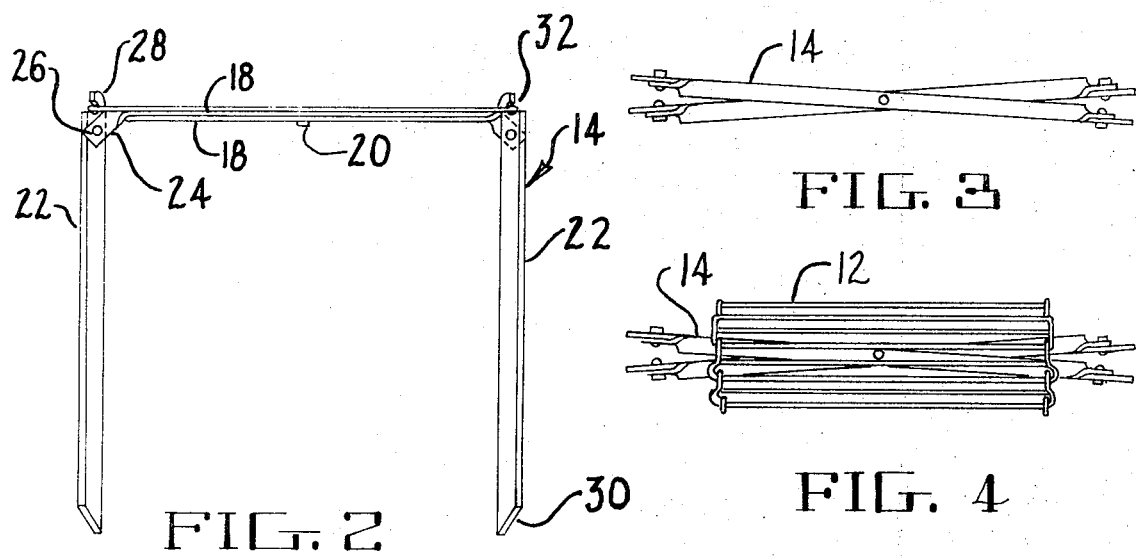
FIG. 1
FIG. 2
FIG. 3
FIG. 4

COLLAPSIBLE GRILL

BACKGROUND OF THE INVENTION

This invention relates to food cooking apparatus with a collapsible support. The invented cooking apparatus is more specifically a grill which is collapsible and is particularly suitable where compactness and portability are desired.

Prior art grills of this general description are collapsible to a flat package, usually to the dimensions of the grate, which is not collapsible. The flat package is convenient for transporting or storing the grill between uses. Certain other prior art devices disclose collapsible grates without accompanying support structure to accommodate the grate above a cooking fire or coals. The primary object of this invention is to provide a grill which includes both a collapsible grate and a collapsible supporting structure which is suitable for convenient storage and transport, and is particularly suitable for camping and backpacking where compactness and weight are prime considerations.

SUMMARY OF THE INVENTION

The invented grill comprises two separable structures, a grate and a support structure which are easily assembled from a compact collapsed roll to a self supported cooking grill. The grate has a plurality of parallel rods interconnected at their ends by integral links permitting the grate to be extended from a roll of rods to a flat rectangular grate. The support structure has a pair of crossed bar members interconnected by a centrally located pivot pin. At the distal ends of the bar members are depending legs which are hinged to the bar members by a pivot pin. Each leg also has a short portion extending above the pivot pin which contains a notch that engages the corner of the rectangular grate to maintain the grate in a flat position or the support members and lock the legs as well as the support members in an operating position. When the grate is removed, the legs can be folded against the crossed bar members and the crossed bar members can be closed as a scissor to a compact elongated package. The compact support structure package can be rolled up in the collapsible grate to occupy a minimum of space.

DETAILED DESCRIPTION OF THE DRAWINGS

FIG. 1 is an exploded view in perspective of the grate and support structure of the grill.

FIG. 2 is a front elevational view of the grill of FIG. 1.

FIG. 3 is a plan view of the support structure in a collapsed position.

FIG. 4 is a plan view of the grate rolled around the support structure of FIG. 3.

DESCRIPTION OF THE PREFERRED EMBODIMENT

Referring to the drawings, the exploded view of FIG. 1 shows the two components of the inverted grill, a collapsible grate 12 and a support structure 14. The grate 12 includes a plurality of thin parallel rods 16, each rod having an orthogonal portion 16a at each end which is bent with a closed hook around the ends of the next adjacent rod 16b as shown in the exemplars in FIG. 1. Thus, one rod is linked to the next rod in a continuing series. The penultimate rod 16c merely loops around to form the last rod 16d in the series since no link on the last rod is necessary. Thus, the grate formed is rigid in a direction parallel with the length of the rods and flexible in a direction orthogonal to the rods.

The support structure 14 includes a pair of crossed support members 18 which are connected at their centers by a pivot pin 20. The crossed support members are fabricated from flat bars and are interconnected to permit them to collapse in the same manner as a pair of closing scissors. Four legs 22 are connected to the distal ends 24 of the crossed support members 18 and pivotally secured by pivot pins 26. For example, the distal end 24a of crossed member 18a is twisted to provide for pivotal attachment of leg 22a by pin 26a. The leg 22a becomes hinged and can be folded up to the collapsed position shown in phantom in FIG. 1. The twisted distal end of the crossed member prevents the leg from swinging up in the opposite direction by interfering with a notched end portion 28a of the leg. A relatively stable support is thereby provided when the support structure 14 is opened out in the manner shown in FIG. 1. A pointed end 30 on the depending support portion of the legs 24 can be imbedded in the ground to provide leveling or adjustment of the elevation and further add to the stability of the grill.

The attachment of the grate to the support structure is shown clearly in FIG. 2. The grate is so dimensioned that each corner of the grate will snugly fit over the notched end portion 28 of the legs and into a notch 32. The grate thereby prevents the legs from collapsing toward the crossed members thus fully stabilizing the support structure as well as itself.

To collapse the grill, the grate is simply removed, the legs folded up against the crossed members and the crossed members collapsed like a pair of scissors to provide the compact elongated package shown in FIG. 3. The grate 12 may simply be rolled up around the collapsed support structure as shown in FIG. 4 to provide a compact and easily transportable package.

The grate and support structure are fabricated from steel for general usages. However, where weight is an important factor such as in back packing, the grate and more particularly the support structure may be fabricated from a lightweight alloy such as an aluminum alloy of a sufficiently high melting point to withstand the generally low campfire temperatures. While the invention is described in the preferred embodiment, other modifications thereto may be incorporated without departing from the scope of the invention.

I claim:

1. A collapsible grill comprising: a pair of crossed support members pivotally connected at their centers, a pivotal connection at the distal end of each crossed support member, a separate leg member connected to each pivotal connection, said leg member having a depending support portion below said connection and a notched portion above said connection, and, a removable, collapsible grate having a plurality of interlinked parallel cross members, said grate engaging said notched portion of said leg members and restraining collapse of said leg members toward the cross members.

2. The collapsible grill of claim 1 wherein said grate is rectangular having four corners and attachable to said notched portion of said leg member at each corner.

3. The collapsible grill of claim 1 wherein said parallel cross members each have an elongated portion and an orthogonal linking portion for connecting to the next adjacent parallel cross member.

4. The collapsible grill of claim 1 wherein said crossed support members are flat bars having a twisted end portion which interferes with said notched portion of said connected legs to restrict the movement of said legs.

* * * * *